Patented June 9, 1953

2,641,601

UNITED STATES PATENT OFFICE 2,641,601

FURANS AND METHOD OF PREPARATION

Moses Wolf Goldberg, Upper Montclair, and Albert Israel Rachlin, Maywood, N. J., assignors to Hoffmann-La Roche Inc., Nutley, N. J., a corporation of New Jersey No Drawing. Application November 24, 1950, Serial No. 197,492

6 Claims. (Cl. 260—347.3)

This invention relates to 2,5-diphenyl-furans and 2,5-diphenyl-monochlorofurans wherein at least one of the phenyls has attached thereto a member of the group consisting of guanyl, 4,5-dihydro-2-imidazolyl and dialkylaminoalkylcarbamyl radicals. The invention also encompasses the salts of the aforesaid compounds with acids, and the method for preparing such compounds. The new compounds are useful as antifungal and antitrichomonas compounds.

The new compounds can be designated as 2-(X-phenyl)-5-($X_1$-phenyl)furans and 2-(X-phenyl)-5-($X_1$-phenyl)monochlorofurans, wherein X and $X_1$ represent hydrogen, guanyl, 4,5-dihydro-2-imidazolyl, or dialkylaminoalkylcarbamyl radicals, at least one of X and $X_1$ being one of the last three mentioned substituents. 2-phenyl-5-($X_1$-phenyl)furans disclosed herein in which $X_1$ represents 4,5-dihydro-2-imidazolyl are claimed in continuation-in-part application Serial No. 269,618, filed February 1, 1952.

In general, the 2,5-diphenyl-monochlorofurans which have a guanyl or 4,5-dihydro-2-imidazolyl radical attached to at least one of the phenyls, can be prepared in the following manner: An acetophenone is condensed with a phenylglyoxal, at least one of these reagents containing a nuclear attached cyano radical, to form a 1-(R-benzoyl)-2-($R_1$-benzoyl)ethylene which can be represented by the formula:

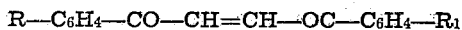

wherein R and $R_1$ represent hydrogen and cyano, at least one of R and $R_1$ being cyano. The cyano-substituted dibenzoyl-ethylene thus formed is reacted with a lower alkanol, e. g., methanol or ethanol, and a large excess of hydrogen chloride to form a 2-($R_2$-phenyl)-5-($R_3$-phenyl)-monochlorofuran wherein $R_2$ and $R_3$ represent hydrogen or a lower alkyl imidic ester hydrochloride radical; namely,

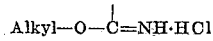

at least one of $R_2$ and $R_3$ being such a radical. The latter compound is reacted with ammonia or ethylene diamine to produce the corresponding 2,5-diphenyl-monochlorofurans wherein at least one of the phenyls has attached thereto a guanyl or 4,5-dihydro-2-imidazolyl radical.

The 2,5-diphenyl-furans which have a guanyl or 4,5-dihydro-2-imidazolyl radical attached to at least one of the phenyls can be prepared as follows: The cyano-substituted dibenzoyl-ethylenes are treated with stannous chloride in the presence of concentrated hydrochloric and glacial acetic acid, to form 2-(R-phenyl)-5-($R_1$-phenyl)furans wherein R and $R_1$ have the same meaning as defined hereinabove. The thus formed cyano-substituted 2,5-diphenyl-furans are then reacted with a lower alkanol and hydrogen chloride to produce 2-($R_2$-phenyl)-5-($R_3$-phenyl)-furans wherein $R_2$ and $R_3$ have the same meaning as hereinabove defined. The thus formed 2,5-diphenyl-furan lower alkyl imidic ester hydrochlorides are reacted with ammonia or ethylene diamine to produce the corresponding guanyl and 4,5-dihydro-2-imidazolyl-substituted 2,5-diphenyl-furans.

The 2,5-diphenyl-monochlorofurans and the 2,5-diphenyl-furans wherein at least one of the phenyls has attached thereto a dialkylaminoalkylcarbamyl radical can be produced in the following manner: The lower alkyl imidic ester hydrochlorides of the 2,5-diphenyl-monochlorofurans or of the 2,5-diphenyl-furans are reacted with water, whereupon the corresponding carboxylic esters are obtained which upon saponification yield the corresponding carboxy compounds. The latter can be converted, for example, by reaction with a thionyl halide, to the corresponding carbonyl halides. The carboxylic esters as well as the carbonyl halides upon treatment with a dialkylaminoalkylamine, such as β-diethylaminoethylamine, yield the corresponding 2,5-diphenyl-monochlorofurans and the 2,5-diphenyl-furans wherein at least one of the phenyls has attached thereto a dialkylaminoalkylcarbamyl radical.

Accordingly, in its broad aspects, the invention comprises converting cyano-substituted dibenzoyl-ethylenes into lower alkyl imidic ester hydrochlorides of 2,5-diphenyl-furans or of 2,5-diphenyl-monochlorofurans, and converting the imidic ester hydrochlorides into the corresponding 2,5-diphenyl-furans and the 2,5-diphenyl-monochlorofurans wherein at least one of the phenyls has attached thereto a member of the group consisting of guanyl, 4,5-dihydro-2-imidazolyl and dialkylaminoalkylcarbamyl radicals.

In preparing monocyano-substituted dibenzoyl-ethylenes, e. g., 1-benzoyl-2-(m- or p-cyanobenzoyl)ethylene, it has been found advantageous to condense acetophenone with a syanophenylglyoxal, rather than a cyanoacetophenone with phenylglyoxal, since better yields are obtained with the first mentioned reaction. Phenylglyoxal and cyano substituted phenylglyoxal are obtained by oxidizing acetophenone and cyano substituted acetophenones, respectively, with selenium dioxide.

The preparation of those starting materials, which are new, is illustrated by the following examples:

EXAMPLE A p-Cyanophenylglyoxal

To a mixture of 500 cc. of dioxane and 20 cc. of water were added 56 grams of finely divided selenium dioxide. The mixture was stirred at 50° C. until the selenium dioxide had dissolved, and then 72.5 grams of p-cyanoacetophenone were added. The mixture was refluxed with stirring for 6 hours, during which time black metallic selenium precipitated. Stirring was continued without heating for 18 hours, and then the selenium was removed by filtration. The solvent was removed in vacuo and the hot residue was dissolved in 300 cc. of acetone. The acetone was flashed off and the residue was distilled on an oil bath. The p-cyanophenylglyoxal was obtained as a heavy, viscous oil boiling at 104–110° C./1.5 m. A sample of the oily material was converted to the hydrate by trituration with water. After several crystallizations from nitromethane, the white crystalline p-cyanophenylglyoxal hydrate melted at 96–100° C.

EXAMPLE B m-Cyanophenylglyoxal

To a mixture of 500 cc. of dioxane and 20 cc. of water were added 56 grams of finely divided selenium dioxide. The mixture was stirred at 50° C. until the selenium dioxide had dissolved, and then 72.5 grams of m-cyanoacetophenone were added. The mixture was refluxed with stirring for 6 hours, during which time black metallic selenium precipitated. Stirring was continued without heating for 18 hours, and then the selenium was removed by filtration through a thin pad of activated charcoal. The solvent was removed in vacuo, and the hot residue was dissolved in 300 cc. of acetone. The acetone was flashed off and the residue was distilled on an oil bath. A heavy viscous oil boiling at 123–126° C. at 0.3 mm. was obtained. The hydrate prepared by treating the glyoxal with water was a white solid which melted at 54–57° C.

EXAMPLE C

1,2-bis(p-cyanobenzoyl) ethylene

A mixture of 43.4 grams of p-cyanophenylglyoxal, 39.6 grams of p-cyanoacetophenone, and 31 cc. of acetic anhydride was heated for 6 hours in an oil bath at 140–150° C. A product started to crystallize from the hot reaction mixture after 1 hour. The mixture was allowed to stand at room temperature for 18 hours. The cake was broken up, the solid matter was collected on a suction filter, and washed with 50 cc. of glacial acetic acid. The product was purified by recrystallization from nitrobenzene to give 1,2-bis(p-cyanobenzoyl) ethylene as yellow-orange needles, M. P. 261–262° C.

EXAMPLE D

1,2-bis(m-cyanobenzoyl) ethylene

A mixture of 79 grams of m-cyanophenylglyoxal, 72 grams of m-cyanoacetophenone, and 56 cc. of acetic anhydride was heated for 6 hours in an oil bath at 145–152° C. The mixture was then allowed to stand at room temperature for 18 hours. The cake was triturated with 25 cc. of glacial acetic acid, filtered, and washed on the filter with 75 cc. of glacial acetic acid, 100 cc. of absolute ethanol, and 100 cc. of ether. The crude yellow solid obtained was recrystallized from 270 cc. of nitrobenzene yielding 1,2-bis(m-cyanobenzoyl) ethylene, M. P. 250–252° C., in the form of yellow crystals.

EXAMPLE E

1-(m-cyanobenzoyl)-2-(p-cyanobenzoyl) ethylene (1) A mixture of 3.54 grams of p-cyanophenylglyoxal hydrate, 2.9 grams of m-cyanoacetophenone, and 4.7 cc. of acetic anhydride was heated for 2.5 hours in an oil bath at 145–150° C. The mixture was allowed to cool to room temperature and washed with 20 cc. of glacial acetic acid, yielding 1 - (m - cyanobenzoyl) - 2 - (p - cyanobenzoyl) ethylene, M. P. 230–234° C.

(2) A mixture of 33.2 grams of m-cyanophenylglyoxal, 30.4 grams of p-cyanoacetophenone, and 24 cc. of acetic anhydride was heated for 2.5 hours in an oil bath at 140–150° C. Vacuum was applied to the hot mixture while cooling. After standing for 48 hours, the product was triturated with 25 cc. of acetic acid, filtered, washed with 50 cc. of acetic acid, and air dried. The yellow solid was recrystallized from 250 cc. of nitrobenzene yielding 1-(m-cyanobenzoyl)-2-(p-cyanobenzoyl) ethylene, M. P. 234–236° C.

EXAMPLE F

1-benzoyl-2-(p-cyanobenzoyl) ethylene (1) A mixture of 79.4 grams of p-cyanophenylglyoxal, 60 grams of acetophenone, and 56.5 cc. of acetic anhydride was heated for 2.5 hours in an oil bath at 145–150° C. Vacuum was applied to the hot mixture to remove the acetic acid formed, and after standing for 24 hours at room temperature, the mixture was triturated with 30 cc. of absolute ethanol, filtered, washed twice with 30 cc. of absolute ethanol, and then 30 cc. of ether. The yellow product thus obtained was recrystallized from 2300 cc. of methanol, yielding 1-benzoyl-2-(p-cyanobenzoyl) ethylene, M. P. 143–145° C. in the form of yellow crystals.

(2) A mixture of 6.7 grams of phenylglyoxal, 7.25 grams of p-cyanoacetophenone, and 7 cc. of acetic anhydride was heated for 2.5 hours in an oil bath at 145–150° C. The reaction mixture was cooled at 4° C. for 24 hours. The mass which formed was filtered, and the product washed with 20 cc. of absolute ethanol. 1-benzoyl-2-(p-cyanobenzoyl) ethylene was thus obtained having a M. P. of 141–143° C.

EXAMPLE G

1-benzoyl-2-(m-cyanobenzoyl) ethylene (1) A mixture of 65.4 grams of m-cyanophenylglyoxal, 47 cc. of acetic anhydride, and 49.4 grams of acetophenone was heated for 2.5 hours in an oil bath at 145–150° C. Vacuum was applied to the hot mixture to remove the acetic acid formed, and after standing for 48 hours at room temperature, the mixture was triturated with 30 cc. of absolute ethanol, filtered, washed twice with 30 cc. of absolute ethanol, and then 30 cc. of ether. The yellow product thus obtained was recrystallized from 1200 cc. of methanol yielding 1-benzoyl - 2 - (m - cyanobenzoyl) ethylene, M. P. 126–127° C., in the form of yellow plates.

(2) A mixture of 15.2 grams of phenylglyoxal, 16.45 grams of m-cyanoacetophenone and 15 cc. of acetic anhydride was heated for 2.5 hours in an oil bath at 145–150° C. The reaction mixture was allowed to stand at room temperature for 24 hours. The semi-solid mass thus obtained was triturated with 20 cc. of absolute ethanol, filtered, washed with 15 cc. of absolute ethanol, and air dried. The crude product was recrystallized from 190 cc. of absolute ethanol, yielding 1-benzoyl-2-(m-cyanobenzoyl)ethylene, M. P. 126–127° C.

EXAMPLE H

*2-phenyl-5-(m-cyanophenyl)furan*

A mixture of 100 grams of stannous chloride dihydrate, 150 cc. of glacial acetic acid and 200 cc. of concentrated hydrochloric acid was refluxed for 5 minutes. To the hot solution were added 25 grams (0.096 mole) of 1-benzoyl-2-(m-cyanobenzoyl)ethylene and the mixture was refluxed for 10 minutes. The mixture was then cooled to 5° C. and the product which had solidified on cooling was filtered. The filter cake was sucked dry and then washed with 500 cc. of cold water and air-dried. The crude product was crystallized from 280 cc. of methanol, yielding 2-phenyl-5-(m-cyanophenyl)fural, M. P. 92.5–93° C.

EXAMPLE I

*2-phenyl-5-(p-cyanophenyl)furan*

A mixture of 100 grams of stannous chloride dihydrate, 150 cc. of glacial acetic acid and 200 cc. of concentrated hydrochloric acid was refluxed for 5 minutes. To the hot solution were added 25 grams (0.096 mole) of 1-benzoyl-2-(p-cyanobenzoyl)ethylene and the mixture was refluxed for 10 minutes. The reaction mixture was cooled to 5° C. and the product which had solidified was filtered. The filter cake was sucked dry and then washed with 500 cc. of cold water and air-dried. The 2-phenyl-5-(p-cyanophenyl)-furan thus obtained was crystallized from 575 cc. of methanol, M. P. 122–124° C.

The following examples will serve to illustrate the preparation of the guanyl, 4,5-dihydro-2-imidazolyl, and dialkylaminoalkylcarbamyl substituted 2,5-diphenyl-chlorofurans and 2,5-diphenyl-furans.

EXAMPLE 1

A solution of 5 grams of 1,2-bis(p-cyanobenzoyl)ethylene in 225 cc. of nitrobenzene was distilled until 75 cc. of distillate had been collected. The solution was cooled to room temperature and 20 cc. of methanol were added. The slurry was then cooled in an ice bath for 30 minutes and saturated while stirring with anhydrous hydrogen chloride. The reaction mixture was transferred to a pressure bottle and shaken mechanically for 3 hours at room temperature, during which time a clear dark solution resulted. The sealed bottle was allowed to stand at room temperature for 6 days. The intermediate, 2,5-di[p-(α-iminomethoxymethyl)phenyl]-3-chlorofuran dihydrochloride began to crystallize after the first day. The amount of precipitate increased and finally, on the sixth day, the heavy orange precipitate was gathered on a filter, washed with anhydrous ether, and dried in a vacuum desiccator. A sample of the intermediate was completely water soluble.

A solution made up of 5.5 grams of 2,5-di[p-(α-iminomethoxymethyl)phenyl]-3-chlorofuran dihydrochloride, 50 cc. of methanol, and 1.7 grams of anhydrous ethylene diamine was refluxed for 6 hours. The solution which was originally clear became turbid, and after 2 hours a crystalline precipitate started to appear. The slurry was cooled at 4° C. for 18 hours, filtered, washed with water, and air dried. Recrystallized once from a mixture of 325 cc. of glacial acetic acid, 5 cc. of concentrated hydrochloric acid and 35 cc. of water, the product obtained was 2,5-bis[p-(4,5-dihydro-2-imidazolyl)phenyl]-3-chlorofuran dihydrochloride monohydrate, M. P. 360° C. with decomposition. The product was obtained in the form of yellow crystals.

EXAMPLE 2

A suspension of 2.86 grams of 1,2-bis(p-cyanobenzoyl)ethylene in 50 cc. of absolute ethanol was stirred in an ice bath for 30 minutes, and then saturated with dry hydrogen chloride. The slurry was stored at room temperature for 24 hours, and then allowed to stand for 7 days at room temperature without stirring, after which time the solid which had formed was filtered, washed with ether, and dried in a vacuum desiccator. The solid thus obtained was 2,5-di[p-(α-iminoethoxymethyl)phenyl]-3-chlorofuran dihydrochloride.

3.5 grams of the above imidic ester hydrochloride was heated in a pressure bottle at 70° C. for 6 hours with 60 cc. of methanolic ammonia. The reaction mixture was cooled to room temperature and the solvent was removed in vacuo. The residue was boiled with 60 cc. of glacial acetic acid, 5 cc. of concentrated hydrochloric acid, and 3 cc. of water, filtered from the insoluble matter, and cooled slightly. Ether was added until the filtrate became slightly turbid, the solution being then cooled to room temperature, and finally stored at 4° C. for 16 hours. The product was collected on a filter, washed with ether, and dried. Upon recrystallization from acetic acid-water-ether, 2,5-bis(p-guanylphenyl)-3-chlorofuran dihydrochloride monohydrate, M. P. 338–339° C., with decomposition, was obtained.

EXAMPLE 3

A suspension of 11.4 grams of 1,2-bis(m-cyanobenzoyl)ethylene in 200 cc. anhydrous ethanol was stirred while cooling in an ice bath for 30 minutes. The cold mixture was saturated with anhydrous hydrogen chloride, and then stirred at room temperature for 24 hours. The mixture was allowed to stand for 5 days at room temperature without stirring, and then after dilution with 200 cc. of ether, the solid was gathered on a filter, washed with ether, and dried in vacuo over solid potassium hydroxide for several days. The solid was 2,5-di[m-(α-iminoethoxymethyl)-phenyl]-3-chlorofuran dihydrochloride.

The above obtained imidic ester hydrochloride was heated at 70° C. in a pressure bottle for 6 hours with 200 cc. of 11 per cent methanolic ammonia. After being cooled to room temperature, the clear solution was evaporated to dryness in vacuo. The solid was dissolved in 300 cc. of hot glacial acetic acid and 60 cc. of water. The solution was clarified by filtration through a hot funnel and to the warm filtrate were added 175 cc. of ether in small portions. The slightly turbid solution was cooled to room temperature. The crystalline product was filtered, washed with ether, and dried, yielding, in the form of pale yellow crystals, 2,5-bis(m-guanylphenyl-(3-chlorofuran dihydrochloride monohydrate, M. P. 296–298° C.

The free base of this compound was prepared by neutralizing a methanol-water solution of the dihydrochloride with dilute sodium hydroxide solution. Purified by recrystallization from methanol-water, the pure base was obtained in the form of very pale yellow crystals, M. P. 186–188° C., with decomposition.

EXAMPLE 4

Starting with 5.7 grams of 1-(m-cyanobenzoyl)-2-(p-cyanobenzoyl)ethylene, and following the same procedure as described in Example 3, there was obtained 2-[m-(α-iminoethoxymethyl)phenyl]-5-[p-(α-iminoethoxymethyl)phenyl]-3(or 4)-chlorofuran dihydrochloride. The imidic ester hydrochloride was heated at 70° C. for 6 hours in a pressure bottle with 130 cc. of 11 per cent methanolic ammonia. The reaction mixture was cooled to room temperature, and the crystalline product was filtered, washed with ether, and dried, yielding 2-(m-guanylphenyl)-3(or 4)-chloro-5-(p-guanylphenyl)furan dihydrochloride monohydrate, M. P. 348–350° C.

EXAMPLE 5

Starting with 5.7 grams of 1-(m-cyanobenzoyl)-2-(p-cyanobenzoyl)ethylene, and proceeding in the same manner as described in Example 3, there was obtained 2-[m-(α-iminoethoxymethyl)phenyl]-5[p-(α-iminoethoxymethyl)phenyl]-3(or 4)-chlorofuran dihydrochloride. The imidic ester hydrochloride was refluxed for 6 hours with 50 cc. of methanol and 2.44 grams of anhydrous ethylene diamine. The clear solution became turbid after 4 hours and at the end of 6 hours a very heavy slurry of crystals had formed. After cooling for 16 hours at 4° C., the solid was gathered on a filter, washed with ether, and dried. Recrystallized from 450 cc. of glacial acetic acid, 60 cc. of water, and 110 cc. of ether, the 2-[m-(4,5-dihydro-2-imidazolyl)phenyl]-3(or 4)-chloro-5-[p-(4,5-dihydro-2-imidazolyl)-phenyl]-furan hydrochloride was obtained in the form of yellow crystals, M. P. 336–338° C. with decomposition.

EXAMPLE 6

A suspension of 10.5 grams of 1-benzoyl-2-(m-cyanobenzoyl)ethylene in 50 cc. of absolute ether, and 50 cc. of methanol was stirred while being cooled in an ice bath for 30 minutes. Dry hydrogen chloride was passed into the suspension for 25 minutes. Within the first 5 minutes, the suspended matter dissolved and the solution became progressively darker as the hydrogen chloride was added. The solution was transferred to a pressure bottle. Within 15 minutes, a heavy crystalline precipitate formed. After standing at room temperature for 24 hours, the slurry was diluted with ether, the crystalline precipitate was filtered, washed with ether, and dried in vacuo over solid potassium hydroxide, yielding 2-phenyl-3(or 4)-chloro-5-[m-(α-iminomethoxymethyl)phenyl]-furan hydrochloride, in the form of yellow-orange crystals which, on recrystallization from methanol-ether, melted at 193–194° C.

A solution of 5.9 grams of the thus obtained imidic ester hydrochloride in 20 cc. of methanol containing 1.35 grams of anhydrous ethylene diamine was refluxed for 6 hours. The solution was cooled at 4° C. for about 16 hours, and the resulting crystalline product was filtered, washed with ether, and then recrystallized from 140 cc. of absolute ethanol, 15 cc. of alcoholic hydrogen chloride, and 9 cc. of water to yield 2-phenyl-3(or 4)-chloro-5-[m-(4,5-dihydro-2-imidazolyl)-phenyl]-furan hydrochloride, M. P. 287–288° C., in the form of pale yellow crystals. The free base of this compound was prepared by neutralizing a methanol-water solution of the hydrochloride with dilute sodium hydroxide solution. Recrystallized from methanol, the free base melted at 188.5–189.5° C.

EXAMPLE 7

A solution of 5.6 grams of 2-phenyl-3(or 4)-chloro-5-[m-(α-iminomethoxymethyl)phenyl]-furan hydrochloride in 100 cc. of 11 per cent methanolic ammonia was heated in a pressure bottle at 70° C. for 6 hours. The clear solution was cooled to room temperature and evaporated to dryness in vacuo. The residue was recrystallized with a mixture of 250 cc. of acetonitrile, 3 cc. of concentrated hydrochloric acid, and 20 cc. of water, yielding 2-phenyl-3(or 4)-chloro-5-(m-guanylphenyl)furan hydrochloride, M. P. 250–253° C. in the form of pale yellow crystals.

EXAMPLE 8

A stirred suspension of 5.22 grams of 1-benzoyl-2-(p-cyanobenzoyl)ethylene in 50 cc. of methanol was cooled in an ice bath for 30 minutes. A moderate stream of anhydrous hydrogen chloride was passed into the stirred suspension. Within 5 minutes, all the suspended matter had dissolved. The introduction of the hydrogen chloride was continued for a total of 15 minutes, and the solution become progressively darker. The solution was transferred to a pressure bottle and allowed to stand at room temperature for 2 days. Crystallization began within 30 minutes after the solution was transferred to the pressure bottle. The solid was gathered on a filter, washed with ether, and dried in vacuo over solid KOH, yielding 2-phenyl-3(or 4)-chloro-5-[p-(α-iminomethoxymethyl)phenyl]- furan hydrochloride, M. P. 230–235° C.

5.4 grams of the imidic ester hydrochloride thus obtained was refluxed for 6 hours with 45 cc. of methanol, and 1.35 grams of anhydrous ethylene diamine. The reaction mixture was cooled at 4° C. and a crystalline base, M. P. 186–203° C., was obtained. Concentration of the mother liquor to 20 cc. followed by cooling at 4° C. produced a second crop of crystals of the corresponding hydrochloride, M. P. 270–288° C. with decomposition. The two materials were combined and heated on a steam bath with 75 cc. of methanol and 5 cc. of methanolic hydrogen chloride. A small amount of white insoluble matter was removed by filtration, and the filtrate was cooled to 4° C., whereupon crystals formed in the form of yellow cubes and light yellow needles. This material was recrystallized from a mixture of 185 cc. of acetonitrile, 5 cc. of concentrated hydrochloric acid, and 30 cc. of water, whereupon fluffy greenish yellow needles, M. P. 305–309° C. with decomposition, were obtained. The 2-phenyl-3(or 4)-chloro-5-[p-(4,5-dihydro-2-imidazolyl)phenyl]-furan hydrochloride thus obtained was found to crystallize in the form of pale yellow cubes, M. P. 299° C., with decomposition, when recrystallized from methanol, and in the form of fluffy greenish yellow needles, M. P. 298–300° C., with decomposition, when recrystallized from acetonitrile-water.

The free base was prepared by treating a methanol-water solution of the hydrochloride with 0.1 N sodium hydroxide solution. Recrystallized from methanol, the free base melted at 211–212° C., and was obtained in the form of pale yellow crystals.

EXAMPLE 9

A solution of 5.7 grams (0.023 mole) of 2-phenyl-5-(m-cyanophenyl)furan in 25 cc. of chloroform and 1.2 cc. (0.03 mole) of methanol was cooled in an ice bath for 30 minutes. Anhydrous hydrogen chloride was passed into the cold solution for 7 minutes and the resulting dark-colored saturated solution was stored at about 4° C. for about 16 hours. The reaction mixture which now consisted of a thick slurry of orange crystals was heated in vacuo to 50° C. in order to remove the chloroform. The residue was triturated with 125 cc. of ether and the solid was filtered with suction. The filter cake was washed three times with 75 cc. portions of ether. The resulting compound was 2-phenyl-5-[m-($\alpha$-iminomethoxymethyl)phenyl]-furan hydrochloride.

A mixture of 3.2 grams (0.01 mole) of 2-phenyl-5-[m-($\alpha$-iminomethoxymethyl) phenyl]-furan hydrochloride, 20cc of ethanol and 0.78 cc. (0.012 mole) of anhydrous ethylene diamine was refluxed for six hours. The clear solution was allowed to crystallize at about 4° C. A first crop of crystals having a M. P. of 274–276° C. was obtained. The mother liquor was evaporated to dryness and crystallization of the residue from 15 cc. of methanol yielded a second crop of crystals, M. P. 272–274° C. The two crops were combined and recrystallized from 35 cc. of methanol containing 1 cc. of 25 per cent methanolic hydrogen chloride. The crystals were 2-phenyl-5-[m-(4,5-dihydro-2-imidazolyl) phenyl]-furan hydrochloride, M. P. 276–278° C.

A methanol-water solution of 2-phenyl-5-[m-(4,5-dihydro-2-imidazolyl)phenyl]-furan hydrochloride was converted to the free base with an excess of sodium hydroxide solution. Recrystallized from methanol, the white crystalline 2-phenyl-5-[m-(4,5-dihydro-2-imidazolyl)phenyl]-furan melted at 180–181° C. To 100 mg. of the free base dissolved in 3 cc. of methanol were added 3 drops of 85 per cent lactic acid. The solution was evaporated to dryness in vacuo and the residue was crystallized, first from ethanol-ether and then from acetonitrile. The lactate salt thus obtained melted at 158–160° C.

EXAMPLE 10

A mixture of 7.75 grams (0.025 mole) of 2-phenyl-5-[m-($\alpha$-iminomethoxymethyl)-phenyl]-furan hydrochloride and 150 cc. of 11 per cent methanolic ammonia was heated in a pressure bottle for six hours at 70° C. The solution was allowed to cool to room temperature and the solvent was removed in vacuo. The residue was dissolved in a hot mixture of 100 cc. of acetonitrile and 10 cc. of water. The solution was cooled to about 4° C. and a total of 200 cc. of ether in 50 cc. portions was added over a period of seven hours. 2-phenyl-5-(m-guanylphenyl)furan hydrochloride crystallized in the form of buff-colored needles and melted at 215–216° C.

EXAMPLE 11

A solution of 38 grams (0.155 mole) of 2-phenyl-5-(p-cyanophenyl)furan in 200 cc. of chloroform and 9.5 cc. (0.24 mole) of methanol was cooled in an ice bath for 30 minutes. Anhydrous hydrogen chloride was passed into the cold solution for 10 minutes and a resulting dark-colored saturated solution was stored at about 4° C. for about 16 hours. The reaction mixture was heated in vacuo at about 50° C. in order to remove the chloroform. The solid residue was triturated with 500 cc. of ether and the solid was filtered off with suction. The filter cake was washed with a total of 500 cc. of ether and air-dried. The cake consisted of 2-phenyl-5-[p-($\alpha$-iminomethoxymethyl)phenyl]furan hydrochloride.

A solution of 30.9 grams (0.099 mole) of 2-phenyl-5-[p-($\alpha$-iminomethoxymethyl)phenyl]-furan hydrochloride, 210 cc. of ethanol and 8.5 cc. of anhydrous ethylene diamine (0.13 mole) was stirred and refluxed for six hours. Within 15 minutes a crystalline solid started to appear and ammonia was liberated. The reaction mixture was cooled to about 4° C. and permitted to stand overnight. It was then filtered, washed with 25 cc. of cold ethanol and then 100 cc. of ether. Recrystallized from 700 cc. of methanol containing 25 cc. of 25 per cent methanolic hydrogen chloride, the 2-phenyl-5-[p-4,5-dihydro-2-imidazolyl)phenyl]-furan hydrochloride thus obtained melted at 312–313° C. with decomposition.

A methanol-water solution of 2-phenyl-5-[p-(4,5-dihydro-2-imidazolyl) phenyl]-furan hydrochloride was converted to the free base by treatment with an excess of sodium hydroxide solution. Recrystallized from methanol, the crystalline free base, 2-phenyl-5-[p-(4,5-dihydro-2-imidazolyl)phenyl]-furan, melted at 203–204° C.

To a solution of 1.3 grams of 2-phenyl-5-[p-(4,5-dihydro-2-imidazolyl) phenyl]-furan dissolved in 15 cc. of warm methanol was added 0.55 cc. of 85 per cent lactic acid. The solution was evaporated to dryness in vacuo and the solid residue was recrystallized from 15 cc. of methanol and 10 cc. of ether. 2-phenyl-5-[p-(4,5-dihydro-2-imidazolyl)phenyl]-furan lactate was obtained in the form of pale yellow crystals, M. P. 197.5–198° C.

EXAMPLE 12

A mixture of 12.4 grams (0.04 mole) of 2-phenyl-5-[p-($\alpha$-iminomethoxymethyl)phenyl]-furan hydrochloride and 150 cc. of 11 per cent methanolic ammonia was heated in a pressure bottle for six hours at 70° C. The solution was allowed to cool to room temperature and the solvent removed in vacuo. The residue was crystallized from 180 cc. of hot ethanol containing 15 cc. of ethanolic hydrogen chloride. The 2-phenyl-5-(p-guanylphenyl)furan hydrochloride thus obtained melted at 283–284° C.

EXAMPLE 13

1 gram of 2-phenyl-5-[p-($\alpha$-iminomethoxymethyl)phenyl]-furan hydrochloride was refluxed for one hour with 100 cc. of water. The mixture was cooled to 25° C. and the crude solid product was filtered, washed with water and air-dried. On recrystallization from 75 cc. of methanol, there was obtained 2-phenyl-5-(p-carbomethoxyphenyl)furan, M. P. 153–155° C.

A mixture of 7.87 grams (0.023 mole) of 2-phenyl-5-(p-carbomethoxyphenyl)furan and 85 cc. of $\beta$-diethylaminoethylamine was refluxed for 16 hours. The excess amine was removed in vacuo and the viscous residual oil was placed in a vacuum desiccator over sulfuric acid. After several days some crystallization began and eventually the entire residue became a mass of needles interspersed through the oil. The entire mass was dissolved in 50 cc. of hot acetonitrile, cooled slightly, and set in a refrigerator. After three weeks a mass of crystals had appeared. The supernatant liquid was decanted and the solid was washed with ether. The 2-phenyl-5-[p-(β-diethylaminoethyl) carbamylphenyl] - furan thus obtained was recrystallized from 10 cc. of acetonitrile, M. P. 106–107° C. The hydrochloride was prepared by dissolving the base in an equivalent amount of dilute hydrochloric acid.

In a similar manner 2-phenyl-5-[m-(β-diethylaminoethyl) carbamylphenyl]-furan may be prepared from 2-phenyl-5-(m-carbomethoxyphenyl)-furan which in turn can be prepared by refluxing with water 2-phenyl-5-[m-(α-iminomethoxymethyl) phenyl]-furan hydrochloride.

EXAMPLE 14

A mixture of 10.62 grams (0.03 mole) of 2-phenyl-3(or 4)-chloro-5-[m-(α - iminomethoxymethyl) phenyl]-furan hydrochloride and 600 cc. of water was refluxed for 3.5 hours. The reaction mixture was cooled in an ice bath, the supernatant liquid was separated by decantation, and the residue was dissolved in 300 cc. of hot methanol. The solution was cooled first to room temperature and then at about 4° C. whereupon crystallization of 2-phenyl-3(or 4)-chloro-5-(m-carbomethoxyphenyl) furan occurred, M. P. 109–111° C.

A solution of 1.3 grams (0.0041 mole) of 2-phenyl-3(or 4)-chloro-5-(m - carbomethoxyphenyl) furan in 50 cc. of methanol and 25 cc. of 1.0 N sodium hydroxide was refluxed for three hours. The hydrolysis mixture was diluted with 250 cc. of cold water and acidified to Congo-Red with 6 N hydrochloric acid. The resulting precipitate was filtered, washed with water and dried in vacuo at 70° C. The 2-phenyl-3(or 4)-chloro-5-(m-carboxyphenyl) furan thus obtained was purified by sublimation at 220° C. and 1.0 mm., followed by recrystallization with benzene-ethyl acetate, M. P. 223–224° C.

Six and two-tenths grams (0.021 mole) of crude 2-phenyl-3(or 4)-chloro-5-(m-carboxyphenyl) furan was suspended in 75 cc. of thionyl chloride. The mixture was refluxed for 15 minutes and then the clear solution was allowed to stand at room temperature for about 16 hours. The solvent was then removed leaving a residue which was recrystallized from ether-petroleum ether to yield crystals of 2-phenyl-3(or 4)-chloro-5-(m-chloroformylphenyl)furan, M. P. 111–113° C.

To 0.9 gram (0.0077 mole) of β-diethylaminoethylamine, 50 cc. of water and 2 cc. of 1 N sodium hydroxide contained in a flask cooled with an ice bath, was added with stirring over 15 minutes a solution of 0.5 gram (0.0016 mole) of 2-phenyl-3(or 4)-chloro - 5 - (m - chloroformylphenyl) furan in 35 cc. of ether. The mixture was stirred 45 minutes longer while being cooled in the ice bath and finally the ether layer was separated. The aqueous phase was extracted with 25 cc. of ether and the combined ether extracts were dried at 4° C. over sodium sulfate. Removal of the solvent in vacuo left an oil which was converted to the hydrochloride with methanolic hydrogen chloride. The amorphous hydrochloride was crystallized from methanol, benzene and ether to yield 2-phenyl-3(or 4)-chloro-5-[m-(β-diethylaminoethyl) carbamyl phenyl]-furan hydrochloride, M. P. 159–161° C.

The same compound can be prepared in the following manner:

A mixture of 5.0 grams (0.016 mole) of 2-phenyl-3(or 4)-chloro - 5 - (m - carbomethoxyphenyl) furan and 50 cc. of β-diethylaminoethylamine was refluxed for 12 hours. The excess amine was removed in vacuo and the residual oil was converted to the hydrochloride with methanolic hydrogen chloride. Removal of the solvent left the resinous hydrochloride, which was dissolved in 20 cc. methanol and 50 cc. of benzene. Ether was added to slight turbidity and the solution was then kept at about 4° C. for 16 hours. Crystallization of 2-phenyl-3(or 4)-chloro-5-[m - (β - diethylaminoethyl) carbamyl phenyl]-furan hydrochloride occurred. The compound had a melting point, on recrystallization from methanol-benzene-ether, of 157–159° C.

We claim:

1. A compound of the class consisting of 2,5-diphenyl-furans and 2,5-diphenyl-monochlorofurans wherein at least one of the phenyls has attached thereto a member of the group consisting of guanyl, and dialkylaminoalkylcarbamyl radicals, and the acid addition salts thereof.

2. 2,5-diphenyl-furans wherein at least one of the phenyls is substituted by the radical

3. 2,5-diphenyl-monochlorofurans wherein at least one of the phenyls is substituted by the radical

4. 2,5-diphenyl-furans wherein at least one of the phenyls is substituted by the radical

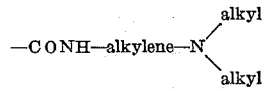

5. 2,5-bis(m - guanylphenyl)monochlorofuran dihyrochloride.

6. 2-phenyl - 5 - [p - (β - diethylaminoethyl) - carbamylphenyl]furan.

MOSES WOLF GOLDBERG.
ALBERT ISRAEL RACHLIN.

No references cited.